United States Patent [19]

Kartesz

[11] 4,161,158
[45] Jul. 17, 1979

[54] PRESERVATION OF LIVE FISH BAIT

[76] Inventor: Frank A. Kartesz, 760 Somerset Ave., Rockwood, Pa. 15557

[21] Appl. No.: 821,615

[22] Filed: Aug. 3, 1977

[51] Int. Cl.² ............................................. A01K 67/00
[52] U.S. Cl. ............................................ 119/1; 119/2
[58] Field of Search ....................... 119/1, 2, 3; 43/55

[56] References Cited

U.S. PATENT DOCUMENTS

| 3,239,413 | 3/1966 | Chaney | 119/1 X |
| 3,306,256 | 2/1967 | Lewis | 119/3 |
| 3,499,420 | 3/1970 | Atwell | 119/1 |

Primary Examiner—Hugh R. Chamblee
Attorney, Agent, or Firm—Robert D. Yeager

[57] ABSTRACT

Underground dwelling live fish bait is preserved by sterilizing the bait and packing it in a media containing nutrients, an antibiotic and a stress reliever. The packed bait is maintained at a temperature between 33 and 55 degrees Fahrenheit. Surface dwelling fish bait is preserved by packing it in a media containing nutrients, an antibiotic and a stress reliever and maintaining the temperature between 33 and 55 degrees Fahrenheit.

12 Claims, No Drawings

PRESERVATION OF LIVE FISH BAIT

BACKGROUND OF THE INVENTION

1. Field of the Invention

This invention relates to live fish bait and more particularly to a method and composition for preserving underground and surface dwelling live fish bait.

2. Description of the Prior Art

Underground dwelling live fish bait such as earthworms, redworms, Northern night crawlers and the like, and surface dwelling live fish bait such as meal worms, maggots and the like are accepted by fishermen as some of the best fish bait. A large industry has grown in raising, harvesting, distributing and selling ground dwelling fish bait. Typically the bait is harvested and shipped to distributors or retailers in pure form and the distributor or retailer places it in a media such as peat moss and stores the bait in a cool place. The bait is repackaged in a form suitable for sale to a consumer, in a paper cup or the like, usually one dozen per container. The bait when placed in the containers for sale, exhibit a mortality rate which varies on the media employed, the crowding experienced by the bait, the temperature of storage, and other environmental effects. However, the storage time before mortality occurs is typically short thereby restricting the distribution of bait to the retailer receiving the bait in bulk and packaging it internally for sale.

The problem of storing Northern night crawlers, (perhaps the most popular ground dwelling fish bait) is acute, particularly when small containers are used. The mortality of the Northern night crawler is particularly high when packed in small containers.

In accordance with the present invention a media and method for sustaining the life of fish bait is provided.

BRIEF DESCRIPTION OF THE INVENTION

Underground dwelling live fish bait is preserved by sterilizing the bait and packing it in a media containing nutrients, an antibiotic and a stress reliever. The packed bait is maintained at a temperature between 33 and 55 degrees Fahrenheit. Surface dwelling live fish bait is preserved by packing it in the same media and controlling the temperature between 33 and 55 degrees.

DETAILED DESCRIPTION OF THE INVENTION

"Underground dwelling fish bait" as used herein refers to the analyds such as Northern night crawlers, redworms and the like; while "surface dwelling fish bait" refers to maggots, meal worms and the like.

Sterilization of the underground dwelling fish bait is accomplished by immersing the bait in a 10 to 15 percent by weight aqueous solution of ethanol for 10 to 15 seconds. This treatment kills the bacteria on the bait while not adversely affecting its life span. Preferably, when a shipment of bait is received by the processor, it should be sterilized as soon as possible and then packed in the media for long term storage and subsequent repackaging in small containers.

The media used for packing the bait in both bulk storage and small containers contains a variety of ingredients which perform specific functions. In order to provide the proper texture to the media, peat moss is a primary constituent. Both Michigan and Canadian peat should be used in a blend of equal parts of those peat mosses. Further, the Michigan peat is less acidic than Canadian peat thus contributing to a more desirable pH in the storage media.

Another ingredient which contributes to the texture of the media is sawdust. The sawdust is essentially inert, however, upon decomposition, provides some food for the bait.

Topsoil is used in the media to provide iron and other trace elements such as iodine, calcium, phosphorus and the like for nourishment to the bait. Further, topsoil is an available source of humus which acts as a worm food.

A high nutritive component is mixed into the media to provide a food source to the bait. Chicken lay mash has been found to be particularly useful, however, any material having a comparable food value which does not decompose into harmful by-products may be used. A particularly important factor is that the decomposition products of the material used as a substitute for chicken lay mash do not impart excess acidity or alkalinity to the media.

Another nutritive component is maple leaf mold which is the decomposition of both hard and soft wood maple induced by fungus. The leaf material should be at its maximum state of decomposition for the best effects as a supplemental food for the bait. As in the case of chicken lay mash, equivalent materials may be substituted for the maple leaf mold so long as they do not adversely effect the mortality of the bait.

The pH of the media is controlled by adding a weak base such as granulated limestone at 100 percent 20 screen and at 60 percent 60 screen mesh particle size. The weak base reacts with decomposition products of the media produced during storage. Preferably the pH is controlled at 5.5 or greater and preferably between 5.5 and 6. It has been determined that below 5.5 mortality begins to occur, however excess alkalinity, i.e. a pH above 7, adversely affects the feeding habits of the bait and particularly Northern night crawlers.

Most important, an antibiotic is added to the media to retard bacteria growth during bait storage. Accordingly, it has been found that the life of the bait is substantially increased by use of the antibiotic. Penicillin has been found to be effective as an antibiotic, however, other antibiotics may be used to effectively retard bacteria growth.

A stress relieving drug is also added to the media. Upon storage of bait, and particularly Northern night crawlers, the close quarters encountered contributes to mortality. It is believed that a contribution to mortality is made by stress encountered by the bait because of the close conditions. Thus, mortality has been decreased by the addition of cortizone to the media. Other known stress relieving drugs may be used to accomplish this same purpose.

In addition to the above ingredients, supplemental nutrients are added to further prolong the life of the bait. These ingredients include a sugar, such as dextrose, and high potency vitamins having the following ingredients: Vitamin A, Vitamin $B_6$, Vitamin $B_{12}$, Vitamin C, Vitamin D, Vitamin E, Folic Acid, Thiomine, Riboflavin and Niacin. Iron is also added by way of iron mineral tablets.

In preserving the surface dwelling fish bait the media and the controlled temperature are sufficient to sustain life for long periods of time making sterilization unnecessary. However, the packaging techniques along with all other aspects of the invention are the same for the surface dwelling bait as for the underground dwelling bait.

Other ingredients may be added to the media, however, the foregoing are exemplary of ingredients for a media which is excellent for preserving bait.

The following preferred embodiment and example are illustrative of the ingredients, preparation and use of the media.

| PREFERRED EMBODIMENT | | |
|---|---|---|
| Ingredient | Amount Preferred | Preferred Range |
| Canadian peat moss | 4 cu. ft. | |
| Michigan peat moss | 4 cu. ft. | |
| Sawdust (hard wood) | 4 cu. ft. | |
| Topsoil | 4 cu. ft. | |
| Maple leaf mold (hard and soft wood) | 2.5 cu. ft. | |
| Chicken lay mash | 20 lbs. | |
| Limestone | 80 lbs. | |
| Antibiotic (penicillin) | 400,000–600,000 U.S.P. Units | 100,000–12,000,000 U.S.P. Units |
| Stress Reliever (cortizone) | 40–60 mg. | 10–500 mg. |
| Dextrose (0.1N aqueous solution) | 4 quarts | |
| Multiple vitamins | | |
| Vitamin A | 10,000 IU | |
| Vitamin $B_6$ | 4 mg. | |
| Vitamin $B_{12}$ | 12 mg. | |
| Vitamin C | 120 mg. | |
| Vitamin D | 800 IU | |
| Vitamin E | 30 IU | |
| Folic Acid | .8 mg. | |
| Thiomine | 3.0 mg. | |
| Riboflavin | 3.4 mg. | |
| Niacin | 40.0 mg. | |
| Iron Tablets | 200 mg. | |
| pH > 5.5 - | 2 quarts of water is added to the above formulation for underground dwelling bait. No water is added for surface dwelling bait. | |

In preparing the ingredients for incorporation into this media, the peat mosses, sawdust, chicken lay mash, topsoil, maple leaf mold, and limestone are used as supplied. The dextrose is used as a 0.1 N aqueous solution as supplied.

The antibiotic is dissolved in a sufficient quantity of distilled water to produce a homogeneous solution at room temperature.

The stress reliever, vitamins and iron, are also separately dissolved in distilled water to form a homogeneous solution.

The peat mosses, sawdust, topsoil, chicken lay mash, maple leaf mold, and limestone are charged to a bin and mixed with a shovel until apparently homogeneous. The cortizone solution is added to the entire batch with mixing. The dextrose solution is added to the entire batch with mixing. After the addition of the dextrose and cortizone, the batch of media is loaded into wheelbarrows having a volume of 2.5 cu. ft. and the antibiotic, vitamins and iron solutions are added with mixing in the wheelbarrow loads.

The batch is then stored and used as desired. The shelf life of the stored media appears to be indefinite so long as proper air circulation is provided. However, in confined containers, the media develops surface mold in a period of about 6 weeks. The mold does not appear to adversely affect the bait, however, it is unsightly and undesirable to the retail purchaser. Therefore, it is desirable to use the media as soon as possible.

In processing the underground dwelling bait, the bait is received either in pure peat moss or without any packing media. The bait is sterilized by immersing it in a 10 to 15 percent aqueous solution of denatured alcohol for 10 to 20 and preferably 14 to 16 seconds. The bait is then transferred to the media for either bulk storage or small package distribution. When the bait is to be bulk stored, the bait and media are placed in 14 inch×14 inch×2182 inch open flats within a cooler maintained between 34 to 55 degrees Fahrenheit and more preferably between 34 and 40 degrees Fahrenheit. When packaged for sale in small containers, about one dozen Northern night crawlers, 40 maggots, 70 meal worms are packed in a 12 ounce can or jar. It has been found that the bait should occupy about 3 fluid ounces of volume and that about 9 fluid ounces of media should be used for the 3 ounces of bait.

The small containers used for packaging the bait are jars, bottles, plastic bags, cans or the like. Although the bait has been preserved in sealed containers for up to 8 weeks, perforated containers, to allow air circulation permit the bait to survive indefinitely, provided the environmental conditions are maintained.

After packaging the bait in small containers, the environment is controlled at a temperature between 33 and 55 degrees Fahrenheit and more preferably between 34 and 40 degrees Fahrenheit. Thus, the bait must be shipped in refrigerated vehicles and stored in refrigerated coolers.

The following example is illustrative of one specific application of the invention.

| Ingredient | Amount |
|---|---|
| Canadian peat moss | 4 cu. ft. |
| Michigan peat moss | 4 cu. ft. |
| Sawdust | 4 cu. ft. |
| Topsoil | 4 cu. ft. |
| Chicken lay mash | 20 lbs. |
| Maple leaf mold | 2.5 cu. ft. |
| Limestone (100% 20 screen, 60% 60 screen mesh) | 80 lbs. |
| Penicillin | 500,000 units |
| Cortizone | 50 mg. |
| Dextrose (0.1N aqueous solution) | 4 quarts |
| Multiple vitamins | |
| Vitamin A | 10,000 IU |
| Vitamin $B_6$ | 4 mg. |
| Vitamin $B_{12}$ | 12 mg. |
| Vitamin C | 120 mg. |
| Vitamin D | 800 IU |
| Vitamin E | 30 IU |
| Folic Acid | .8 mg. |
| Thiomine | 3.0 mg. |
| Riboflavin | 3.4 mg. |
| Niacin | 40.0 mg. |
| Iron Tablets | 200.0 mg. |
| pH = 6.0 | |
| % water = worms 5%, maggots and meal worms 2% | |

One 500,000 U.S.P. unit tablet of penicillin is dissolved in one cup of water and ⅛ of that cup is added with mixing to one 2.5 cu. ft. wheelbarrow load of media premixed in accordance with the preferred embodiment. One multiple vitamin tablet is dissolved or dispersed in one cup of distilled water and ⅛ of that cup is added with mixing to one 2.5 cu. ft. wheelbarrow of media. The iron tablet is dissolved in one cup of distilled water and ⅛ of that cup is spread over one 2.5 cu. ft. wheelbarrow of media.

Northern night crawlers having an average length of 7 to 8 inches and occupying 3 fluid ounces per dozen were immersed in a 10 percent aqueous denatured alcohol solution for 15 seconds. The sterilized night crawlers were placed in perforated 12 ounce plastic bags containing 9 ounces of the media hereinbefore described. The packaged bait was stored at 33 to 38 degrees Fahrenheit for 8 weeks while inspecting for mortality. The mortality of the night crawlers after 8 weeks was 0 and after 12 weeks was 1 percent.

As can be well recognized by those skilled in the art, other ingredients and packaging techniques may be used while being within the scope of the invention.

What is claimed is:

1. A method of preserving underground and surface dwelling fish bait comprising:
   packing the bait in a media containing nutrients, an antibiotic and a stress relieving drug; and,
   maintaining the temperature of said packed bait between 33 and 55 degrees Fahrenheit.

2. The method of claim 1 including sterilizing the bait prior to said packing.

3. The method of claim 2 wherein said temperature is maintained between 33 and 40 degrees Fahrenheit.

4. The method of claim 2 wherein said bait is sterilized by treating said bait with a 10 to 15 percent aqueous solution of ethyl alcohol.

5. The method of claim 4 wherein said bait is treated by immersing said bait in said solution for 10 to 15 seconds.

6. In a media for packaging ground dwelling fish bait including peat moss, topsoil and nutrients, the improvement comprising:
   a sufficient amount of antibiotic to retard the growth of bacteria within the media; and,
   a sufficient amount of stress relieving drug to reduce the stress encountered by the fish bait within the media.

7. The media of claim 6 wherein said antibiotic is penicillin.

8. The media of claim 6 wherein said antibiotic is present at a level of 100,000 U.S.P. units to 12,000,000 U.S.P. units to 20 cubic feet of media.

9. The media of claim 6 wherein said antibiotic is present at a level of 400,000 U.S.P. units to 600,000 U.S.P. units per 20 cubic feet of media.

10. The media of claim 6 wherein said stress relieving drug is cortizone.

11. The media of claim 6 wherein said stress relieving drug is present at a level of 10 mg. to 500 mg. per 20 cubic feet of media.

12. The media of claim 6 wherein said stress relieving drug is present at a level of 40 to 60 mg. per 20 cubic feet of media.

* * * * *

UNITED STATES PATENT AND TRADEMARK OFFICE
CERTIFICATE OF CORRECTION

PATENT NO. : 4,161,158
DATED : July 17, 1979
INVENTOR(S) : Frank A. Kartesz

It is certified that error appears in the above-identified patent and that said Letters Patent are hereby corrected as shown below:

Column 4, line 7, "2182" should be --2-3/4--.

Signed and Sealed this

Ninth Day of October 1979

[SEAL]

Attest:

RUTH C. MASON
Attesting Officer

LUTRELLE F. PARKER
Acting Commissioner of Patents and Trademarks